(12) United States Patent
Wang et al.

(10) Patent No.: US 10,164,690 B2
(45) Date of Patent: Dec. 25, 2018

(54) METHOD AND DEVICE FOR FORMING MULTI-CELL BEAM (71) Applicant: ZTE Corporation, Shenzhen (CN)

(72) Inventors: Shaopeng Wang, Shenzhen (CN); Hongfeng Qin, Shenzhen (CN)

(73) Assignee: XI'AN ZHONGXING NEW SOFTWARE CO., LTD., Xi'an (CN)

(*) Notice: Subject to any disclaimer, the term of this patent is extended or adjusted under 35 U.S.C. 154(b) by 0 days.

(21) Appl. No.: 15/504,962

(22) PCT Filed: Dec. 17, 2014

(86) PCT No.: PCT/CN2014/094140
§ 371 (c)(1),
(2) Date: Feb. 17, 2017

(87) PCT Pub. No.: WO2015/117508
PCT Pub. Date: Aug. 13, 2015

(65) Prior Publication Data
US 2017/0272130 A1 Sep. 21, 2017

(30) Foreign Application Priority Data
Aug. 20, 2014 (CN) .......................... 2014 1 0413684

(51) Int. Cl.
H04B 7/024 (2017.01)
H04B 7/06 (2006.01)
(Continued)

(52) U.S. Cl.
CPC ........... *H04B 7/024* (2013.01); *H04B 7/0617* (2013.01); *H04B 7/0634* (2013.01);
(Continued)

(58) Field of Classification Search
CPC .... H04B 7/024; H04B 7/0617; H04B 7/0634; H04W 84/045
See application file for complete search history.

(56) References Cited

U.S. PATENT DOCUMENTS

2013/0267241 A1    10/2013  Baek
2013/0294352 A1*   11/2013  Park ................... H04B 7/024
                                                    370/328
(Continued)

FOREIGN PATENT DOCUMENTS

CN    102075959 A    5/2011
CN    102355294 A    2/2012
(Continued)

OTHER PUBLICATIONS

International Search Report for corresponding application No. PCT/CN2014/094140 filed on Dec. 17, 2014; dated May 12, 2015.
(Continued)

Primary Examiner — Freshteh N Aghdam
(74) Attorney, Agent, or Firm — Cantor Colburn LLP (57) ABSTRACT

The disclosure discloses a method and device for forming a multi-cell beam. The method includes: a beam forming vector $b_q$ of each coordination cell in a heterogeneous network is calculated according to a principle of maximizing a signal intensity of a coordination cell scheduling user and minimizing a weighted interference leakage of the coordination cell scheduling user to other coordination cell scheduling users; and the beam forming vector $b_q$ of corresponding coordination cell is updated according to a calculation result, to enable each coordination cell to transmit data to a corresponding scheduling user according to updated beam forming vector $b_q$.

18 Claims, 5 Drawing Sheets

A beam forming vector $b_q$ of each coordination cell in a heterogeneous network is calculated according to a principle of maximizing a signal intensity of a coordination cell scheduling user and minimizing a weighted interference leakage of the coordination cell scheduling user to other coordination cell scheduling users — S101

The beam forming vector $b_q$ of corresponding coordination cell is updated according to a calculation result, to enable each coordination cell to transmit data to a corresponding scheduling user according to updated beam forming vector $b_q$ — S102

(51) Int. Cl.
  *H04W 72/08* (2009.01)
  *H04L 5/00* (2006.01)
  *H04W 84/04* (2009.01)

(52) U.S. Cl.
  CPC ......... *H04L 5/0073* (2013.01); *H04W 72/082* (2013.01); *H04W 84/045* (2013.01); *Y02D 70/00* (2018.01); *Y02D 70/1262* (2018.01); *Y02D 70/1264* (2018.01); *Y02D 70/442* (2018.01); *Y02D 70/444* (2018.01)

(56) References Cited

U.S. PATENT DOCUMENTS

| | | |
|---|---|---|
| 2013/0322374 A1 | 12/2013 | Cai |
| 2014/0094164 A1 | 4/2014 | Hwang et al. |
| 2014/0112288 A1* | 4/2014 | Wei ................ H04J 11/0053 370/329 |
| 2014/0286291 A1* | 9/2014 | Einhaus ................ H04B 7/024 370/329 |
| 2014/0293820 A1* | 10/2014 | Kim .................... H04W 52/243 370/252 |
| 2015/0358947 A1* | 12/2015 | Seo ........................ H04J 11/005 370/329 |

FOREIGN PATENT DOCUMENTS

| | | |
|---|---|---|
| CN | 102938666 A | 2/2013 |
| CN | 103703814 A | 4/2014 |

OTHER PUBLICATIONS

Seok-Hwan Park, et al: "New Beamforming Techniques Based on Virtual SINR Maximization for Coordinated Multi-Cell Transmission", vol. 11, No. 3, Mar. 1, 2012, pp. 1034-1044, XP011433090I; ISSN: 1536-1276.

Supplementary European Search Report Application No. EP14881885.9; dated Feb. 28, 2018; pp. 14.

* cited by examiner

METHOD AND DEVICE FOR FORMING MULTI-CELL BEAM

TECHNICAL FIELD

The disclosure relates to the field of digital communications, and in particular to a method and device for forming multi-cell beam.

BACKGROUND

By improving a topological structure of a network, a heterogeneous network realizes system performance optimization and becomes one of a research focus in mobile communications. The heterogeneous network is composed of a high-power macro base station planned by the network and a low-power node covered by the macro base station and placed independently, the low-power node, which includes a home base station, a micro-cellular and a relay station etc., can realize hotspot region coverage and cell service shunt, so as to obtain cell splitting gain. Since power and coverage of different base stations are different and the low-power node is placed independently, a interference problem of a control channel and a service channel of different base stations is very serious, and the heterogeneous network faces a huge technical challenge.

In a next generation evolving system, such as the $3^{rd}$ Generation Partnership Project Long Term Evolution Advanced (3GPP-LTE-A standard), the interference problem is solved through an inter-cell interference coordination technology, which is an enhanced inter-cell interference coordination schemes (eICIC). The eICIC is one of symbolic key technologies in the LTE-A and used for improving cell edge coverage and realizing the cell service shunt, such as coverage range extension (RE). The eICIC is mainly divided two types: the first one is an eICIC scheme based on a carrier aggregation technology, and the second one is a scheme based on a time-domain almost blank subframes (ABS). A service silence is realized by the ABS through allocating ABS subframes in an interference cell, and user interfered strongly in an original cell is served by the interfered cell through using the ABS subframes, so as to realize inter-cell interference coordination.

A carrier aggregation technology, which is one of key technologies of the LTE-A, is capable of providing high-speed service in a large bandwidth formed through aggregation, and further realizing frequency domain interference avoidance of the heterogeneous network at a component carrier (CC) resolution level. Supposing that a bandwidth of the heterogeneous network is composed of two component carriers: f1 and f2, in order to realize the interference coordination between the macro base station and the femto base station, the f1 and f2 are respectively allocated to users of the macro base station and the femto base station, so as to realize the interference avoidance of the service channel and the control channel of users; or a cell center user of the femto base station is configured with a CC same to the macro cell, and an edge user is configured with a CC different from the macro base station. However, a defect of this scheme is that it can be used by an LTE-A user only, and not compatible to an LTE user. An application of above-mentioned technology is in an important condition of firstly solving a service cell selection problem of users in a cell. In a cellular mobile communication network, all users have a home service cell, which is used for providing service of broadcasting, service transmission etc. for users. In a traditional homogeneous network, a service cell selection of a user is based on a measurement of received signal intensity. In the heterogeneous network, since a transmitting power of newly added node is lower than the macro base station, a coverage range of the newly added node is small through a method for selecting a service cell based on received signal intensity, and cell splitting gain maximization is not realized. In order to improve a priority of a low-power node, extend a coverage range of the low-power node, an enhanced LTE-A heterogeneous network cell selection and re-selection algorithm is proposed in research and discussion of a 3GPP session, mainly refers to a RE algorithm and a path loss algorithm proposed by a Qualcomm Incorporated. An core concept of the RE algorithm is: in traditional service cell selection algorithm, a bias value larger than 0 is added to the reference signal receiving power (RSRP) of the low-power node, and a RSRP compensation value bias for the macro cell is 0, so as to lower a threshold of the low-power node, and increase a probability of an User Equipment (UE) for selecting the low-power node as the service cell. In the cell selection algorithm based on the path loss, a cell with minimum path loss is selected as the service cell by the UE.

The coverage range of the low-power node is extended observably through the above method, which is almost similar to the macro cell. As for users on the coverage edge of the low-power node, even an effect of strong interference source is eliminated through interference elimination measures, a downlink signal to interference plus noise ratio (also called signal to interference plus noise ratio, SINR) is very low, which is caused by the low transmitting power of the service cell (low-power node), thus, a cell spectral efficiency is low.

When multi-antenna technology is used, the inter-cell interference coordination can further be performed in a spatial domain, such as a coordination multi-point (CoMP) transmission technology, through a interaction of mobile user channel information of adjacent cells, a certain interference avoidance policy is applied to the edge user by adjacent cell or combined transmission is applied to the mobile user by multiple cells, so as to improve a throughput capacity of the edge user and a coverage of high-speed data transmission, reduce the interference of the edge user, and increase a cell throughput capacity. In the heterogeneous network, the CoMP acts as an enhanced technology of an eICIC technology, and further increases system capacity based on gain obtained by the eICIC.

At present, an inter-cell coordination beam avoidance algorithm is mainly adaptive to the homogeneous network. In a heterogeneous network scene, there is a large difference in a SINR distribution of cell users, then an effectiveness of traditional interference avoidance algorithm, such as a zero forcing algorithm, a signal to leakage and noise ratio (SLNR), algorithm, is greatly reduced, meantime, the beam avoidance algorithm will be limited by a quantity of antenna along with increasing of density of the low-power node, and freedom is limited.

As mentioned above, the related technical solution has following technical problems:

(1) a large number of edge users occur along with an introduction of the low-power node, a currently-used method for selecting a beam is based on an assumption of the homogeneous cell, but in the heterogeneous network, a beam selection of users is greatly affected by a SINR distribution of different types of cells;

(2) the low-power node introduced in the heterogeneous network uses a multi-antenna technology, as for dense heterogeneous network, a performance of existing method is limited by the freedom.

SUMMARY

Considering the above problem, the disclosure discloses a method and device for forming a multi-cell beam, which is used for solving the above technical problem based on a signal and a weighted interference leakage ratio.

In an embodiment of the disclosure, a method for forming a multi-cell beam is provided, including:

calculating, according to a principle of maximizing a signal intensity of a coordination cell scheduling user and minimizing a weighted interference leakage of the coordination cell scheduling user to other coordination cell scheduling users, a beam forming vector $b_q$ of each coordination cell in a heterogeneous network; and updating the beam forming vector $b_q$ of a corresponding coordination cell according to a calculation result, to enable each coordination cell to transmit data to a corresponding scheduling user according to updated beam forming vector $b_q$.

In an example embodiment, as for each coordination cell, calculating the beam forming vector $b_q$, including: collecting measurement data obtained, according to preset measuring configuration information, by each coordination cell scheduling user; obtaining, according to collected measurement data, signal intensity information including an unknown quantity $b_q$ of the coordination cell scheduling user, and weighted interference leakage information of the coordination cell scheduling user to other coordination cell scheduling users; and adjusting a value of $b_q$ of the coordination cell so as to adjust the signal intensity of the coordination cell scheduling user and a value of the weighted interference leakage of the coordination cell scheduling user to other coordination cell scheduling users, wherein the value of $b_q$ of the coordination cell is determined according to the principle of maximizing the signal intensity of the coordination cell scheduling user and minimizing the weighted interference leakage of the coordination cell scheduling user to other coordination cell scheduling users.

In an example embodiment, the collected measurement data includes: channels of all coordination cells to all scheduling users, a beam forming vector of each coordination cell, and power information of an interference signal received by each coordination cell scheduling user.

In an example embodiment, the collected beam forming vector of each coordination cell includes: as for the coordination cell, the collected beam forming vector is a variable to be solved; and as for other coordination cells, when the beam forming vector of the corresponding coordination cell is updated, the collected beam forming vector is a vector value updated lately; otherwise, the collected beam forming vector is an initial value of the beam forming vector obtained, according to an inherent algorithm, by the corresponding coordination cell.

In an example embodiment, the beam forming vector is calculated by one of the following formulas:

$$b_q = \max_{b_q} \frac{b_q^H E_q b_q}{b_q^H \left(-\sum_{i=1, i \neq q}^Q \lambda_{i,q} A_{i,q}\right) b_q};$$

$$b_q = V_G^{max}\left(E_q, -\sum_{i=1, i \neq q}^Q \lambda_{i,q} A_{i,q}\right);$$

in above-mentioned formulas, $b_q^H$ is a conjugate transpose of the $b_q$, $E_q = h_{q,q}^H h_{q,q}$, $h_{q,q}$ is a channel of the coordination cell q to a scheduling user of the coordination cell q, $A_{i,q} = h_{i,q}^H h_{i,q}$, $h_{i,q}$ is a channel of other coordination cells i≠q) to the scheduling user of the coordination cell q, $\lambda_{i,q}$ is a weighting coefficient, $V_G^{max}$ (A,B) is the maximum generalized eigenvalue vector of a matrix A and a matrix B, and Q is a quantity of the coordination cells.

In an example embodiment, the method further includes: when the coordination cell is a centralized coordination cell, calculating, by a preset center node, the beam forming vector $b_q$ of each coordination cell scheduling user in the heterogeneous network one by one, and transmitting, by the preset center node, each beam forming vector $b_q$ to a corresponding coordination cell; and when the coordination cells are distributed coordination cells, calculating, by each coordination cell, the beam forming vector $b_q$ of the cell scheduling user one by one, and transmitting, by each coordination cell, the calculated beam forming vector $b_q$ to other coordination cells.

In another embodiment of the disclosure, a device for forming a multi-cell beam is further provided, including:

a calculating component, arranged to, calculate, according to a principle of maximizing a signal intensity of the coordination cell scheduling user and minimizing a weighted interference leakage of the coordination cell scheduling user to other coordination cell scheduling users, a beam forming vector $b_q$ of each coordination cell in a heterogeneous network; and an updating component, arranged to update the beam forming vector $b_q$ of a corresponding coordination cell according to a calculation result of the calculating component, to enable each coordination cell to transmit data to a corresponding scheduling user according to updated beam forming vector $b_q$.

In an example embodiment, the calculating component includes: an information collecting element, arranged to collect measurement data obtained, according to preset measuring configuration information, by each coordination cell scheduling user in the heterogeneous network; a variable obtaining component, arranged to obtain, according to collected measurement data, signal intensity information including an unknown quantity $b_q$ of the coordination cell scheduling user, and weighted interference leakage information of the coordination cell scheduling user to other coordination cell scheduling users; and an adjusting element, arranged to, adjust a value of $b_q$ of the coordination cell so as to adjust the signal intensity of the coordination cell scheduling user and a value of the weighted interference leakage of the coordination cell scheduling user to other coordination cell scheduling users, wherein the value of $b_q$ of the coordination cell is determined according to the principle of maximizing the signal intensity of the coordination cell scheduling user and minimizing the weighted interference leakage of the coordination cell scheduling user to other coordination cell scheduling users, determine the value of $b_q$ of the coordination cell.

In an example embodiment, the measurement data collected by the information collecting element includes: channels of all coordination cells to all scheduling users, a beam forming vector of each coordination cell, and power information of an interference signal received by each coordination cell scheduling user; wherein as for the coordination cell, the collected beam forming vector is a variable to be solved; and as for other coordination cells, when the beam forming vector of the corresponding coordination cell is updated, then the collected beam forming vector is a vector value updated lately; otherwise, the collected beam forming vector is an initial value of the beam forming vector obtained, according to an inherent algorithm, by the corresponding coordination cell.

In an example embodiment, the beam forming vector obtained by the calculating component is:

$$b_q = \max_{b_q} \frac{b_q^H E_q b_q}{b_q^H \left(-\sum_{i=1, i \neq q}^{Q} \lambda_{i,q} A_{i,q}\right) b_q}; \text{ or}$$

$$b_q = V_G^{max}\left(E_q, -\sum_{i=1, i \neq q}^{Q} \lambda_{i,q} A_{i,q}\right);$$

in above-mentioned formula, $b_q^H$ is a conjugate transpose of the $b_q$, $E_q = h_{q,q}^H h_{q,q}$, $h_{q,q}$ is a channel of the coordination cell q to a scheduling user of the coordination cell q, $A_{i,q} = h_{i,q}^H h_{i,q}$, $h_{i,q}$ q is a channel of other coordination cells i (i≠q) to the scheduling user of the coordination cell q, $\lambda_{i,q}$ is a weighting coefficient, $V_G^{max}$ (A, B) is the maximum generalized eigenvalue vector of a matrix A and a matrix B, and Q is a quantity of the coordination cells.

In another embodiment of the disclosure, a coordination base station is provided, which covers at least one coordination cell in a heterogeneous network and includes the above-mentioned device for forming the multi-cell beam.

In an example embodiment, when a heterogeneous network system is a centralized system, a coordination base station, which is not selected to be a center node, closes a function of the device for forming the multi-cell beam; or the coordination base station, which is selected to be the center node, enables the device for forming the multi-cell beam and calculates the beam forming vector of each coordination cell in the heterogeneous network one by one; and when the heterogeneous network system is a distributed system, each coordination base station enables the device for forming the multi-cell beam, calculates the beam forming vector $b_q$ corresponding to each coordination cell one by one and transmits calculated beam forming vector to other coordination base stations.

The beneficial effects of the disclosure are as follows:

The method and device of the disclosure, when calculating the beam forming vector of corresponding coordination cell and maximizing the signal intensity of the corresponding coordination cell, the interference leakage to adjacent cells is dynamically adjusted according to an SINR of the cell, an SINR of the adjacent cells and a signal to other cell interference ratio (SOIR), thereby realizing an optimum balance between system performance and interference avoidance, improving an effectiveness of interference management, and further increasing a system capacity of a low-power node.

BRIEF DESCRIPTION OF THE DRAWINGS

In order to clearly describe embodiments of the disclosure or technical solution, the embodiments or drawings described are further described below, obviously, the drawings described below are only part of the embodiments of the disclosure, and those skilled in the art, without creative work, can obtain other drawings based on these drawings.

DETAILED DESCRIPTION OF THE EMBODIMENTS

The technical solution in embodiments of the disclosure is described clearly and completely below with reference to the drawings, obviously, the embodiments described below are only part of the embodiments of the disclosure, not all the embodiments. And all other embodiments obtained by those skilled in the art, without creative work, shall fall within the scope of protection of the disclosure.

As for the existed technical problem, the disclosure discloses the method and device forming the multi-cell beam, the method is a method for forming a beam based on a signal and a weighted interference leakage ratio, by dynamically adjusting a interference leakage of the coordination cell to other coordination cells, to realize an optimum balance between system performance and interference avoidance. And a detailed process of the disclosure is described below with reference to several embodiments.

Example Embodiment 1

Figure 1:
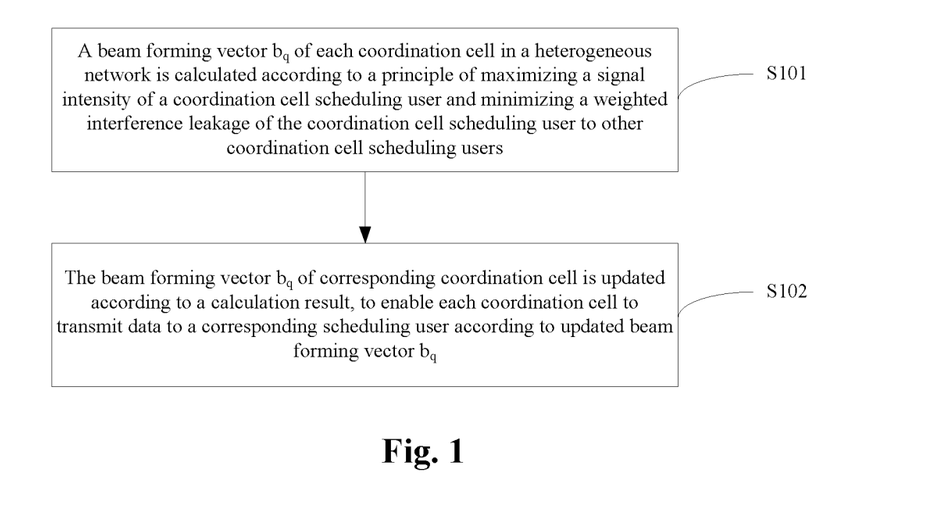
FIG. 1 shows a flowchart of a method for forming a multi-cell beam in an embodiment of the disclosure.

The embodiment of the disclosure discloses a method for forming a multi-cell beam, as shown in FIG. 1, including:

S101, a beam forming vector $b_q$ of each coordination cell in a heterogeneous network is calculated according to a principle of maximizing a signal intensity of a coordination cell scheduling user and minimizing a weighted interference leakage of the coordination cell scheduling user to other coordination cell scheduling users.

In this embodiment, since the heterogeneous network, used for calculating the beam forming vector, includes a distributed structure and a centralized structure, in the disclosure, the heterogeneous networks with different structures are allocated by different subjects to calculate the beam forming vector, so as to adapt different structures, as follows:

as for a beam forming vector calculation in a centralized heterogeneous network, the beam forming vector $b_q$ of each coordination cell in the heterogeneous network is calculated by a preset center node one by one, and then the beam forming vector $b_q$ is transmitted to corresponding coordination cells;

as for a beam forming vector calculation in a distributed heterogeneous network, the beam forming vector $b_q$ of each coordination cell is calculated by each coordination cell; after the beam forming vector $b_q$ of each corresponding coordination cell is obtained, the beam forming vector is transmitted to other coordination cells in order to provide a latest parameter support for calculating corresponding beam forming vector for other coordination cells.

Further, in this step, calculating corresponding beam forming vector $b_q$ of each coordination cell, including:

(1) The measurement data obtained, according to preset measuring configuration information, by the coordination cell scheduling user is collected.

In an example embodiment, the collected measurement data includes: channels of all coordination cells to all scheduling users, a beam forming vector of each coordination cell, and power information of an interference signal received by each coordination cell scheduling user.

In an example embodiment, as for the coordination cell, the collected beam forming vector is a variable to be solved; as for other coordination cells, when the beam forming vector of the corresponding coordination cell is updated, then the collected beam forming vector is a vector value updated lately; otherwise, the collected beam forming vector is an initial value of the beam forming vector obtained, according to an inherent algorithm, by the corresponding coordination cell.

It needs to be noted that, when the beam forming vector of the centralized heterogeneous network is calculated, the measurement data needed for calculating the beam forming vectors of corresponding coordination cells is pre-collected by the center node. And when calculating the beam forming vector of a certain coordination cell, only the measurement data of the coordination cell is extracted, so as to avoid a problem of affecting calculating efficiency caused by repeated collection.

(2) Based on the collected measurement data, signal intensity information including an unknown quantity $b_q$ of the coordination cell scheduling user, and weighted interference leakage information of the coordination cell scheduling user to other coordination cell scheduling users are obtained.

(3) The value of $b_q$ of the coordination cell is adjusted so as to adjust the signal intensity of the coordination cell scheduling user and a value of the weighted interference leakage of the coordination cell scheduling user to other coordination cell scheduling users; moreover the value of $b_q$ of the coordination cell is determined according to the principle of maximizing the signal intensity of the coordination cell scheduling user and minimizing the weighted interference leakage of the coordination cell scheduling user to other coordination cell scheduling users.

In other words, a balance point between signal intensity maximization and weighted interference leakage minimization is needed, and the $b_q$ satisfying the balance point is the $b_q$ obtained in the disclosure.

Further, in this embodiment, through the above calculation principle, the beam forming vector $b_q$ is expressed in two manners, as follows:

$$b_q = \max_{b_q} \frac{b_q^H E_q b_q}{b_q^H \left(-\sum_{i=1, i\neq q}^{Q} \lambda_{i,q} A_{i,q}\right) b_q}; \text{ or;}$$

$$b_q = V_G^{max}\left(E_q, -\sum_{i=1, i\neq q}^{Q} \lambda_{i,q} A_{i,q}\right);$$

in the formula, $E_q = h_{q,q}^H h_{q,q}$, $h_{q,q}$ is a channel of the coordination cell q to the scheduling user of the coordination cell, $A_{i,q} = h_{i,q}^H h_{i,q}$, $h_{i,q}$ is a channel of other coordination cells i (i≠q) to scheduling user of the coordination cell q, $\lambda_{i,q}$ is a weighting coefficient, $V_G^{max}$ (A, B) is the maximum generalized eigenvalue vector of a matrix A and a matrix B (representing the maximum generalized eigenvalue vector of a matrix $E_q$ and a matrix $-\sum_{i=1, i\neq q}^{Q} \lambda_{i,q} A_{i,q}$), and Q is a quantity of the coordination cell.

S102, the beam forming vector $b_q$ of corresponding coordination cell is updated according to a calculation result, to enable each coordination cell to transmit data to a corresponding scheduling user according to updated beam forming vector $b_q$.

The data transmission, based on the beam forming vector obtained through the method of the disclosure, realizes an optimum balance between system performance and interference avoidance, improves an effectiveness of interference management, and further increases a system capacity of a low-power node.

In order to describe the disclosure clearly, a scheme of the disclosure is described below with reference to a design concept and embodiments, to further describe a process of the method disclosed in the disclosure.

In an embodiment of the disclosure, the heterogeneous network is composed of a macro cell and numbers of low-power base stations covered by the macro cell (each coordination cell is covered by a base station), such as a home base station, a femto base station etc., the base station uses M antennas and a terminal uses a single antenna.

First, a process of calculating the beam forming vector, including: (1) a weighting sum rate of the coordination cell is used as a cost function so as to calculate the beam forming vector, in which a weighting sum rate R is as follows:

$$R = \sum_{q=1}^{Q} \alpha_q R_{k,q}$$

$$s.t.\ 1) |b_q| = 1$$

in which Q is a sum of the coordination cells, $b_q$ is a beam forming vector (also called: beam weight or pre-coding vector) of the coordination cell q, $\alpha_q$ is a weighting factor of the coordination cell q, which is related to a priority of a user; $R_{k,q}$ is a transmission rate of a user k in the coordination cell q, a value of the $R_{k,q}$ is:

$$R_{k,q} = \log_2(1 + SINR_{k,q})$$

in above formula, the $SINR_{k,q}$ is a signal to interference noise ratio of a user k in the coordination cell q, a value of the $SINR_{k,q}$ is:

$$SINR_{k,q} = \frac{P_q |h_{k,q} b_q|^2}{\sum_{i=1, i\neq q}^{Q} P_i |h_{k,i} b_i|^2 + \sigma_q^2}$$

in above formula, the $P_q$ and $P_i$ are the transmitting powers of the coordination cells q and i, $\sigma_q^2$ is a noise power, $h_{k,q}$ and $h_{k,i}$ are channels of the coordination cells q and i to the user k, and $b_i$ is a beam forming vector of the cell i;

(2) a Lagrangian function J construction, as follows:

$$J = \sum_{q=1}^{Q} R_{k,q} - \sum_{q=1}^{Q} \mu_b (b_q^H b_q - 1)$$

$\mu_b$ is a Lagrangian constant, $T^H$ represents a transpose conjugate operation to T ($b_q^H$ represents the conjugate operation to $b_q$);

(3) a derivative of the Lagrangian function J to the beam forming vector $b_q^H$ is 0, $\partial J / \partial b_q^H = 0$, and an expression that the derivative is 0 is as follows:

$$(E_q - \mu_b I) b_q = \left(-\sum_{i=1, i\neq q}^{Q} \lambda_{i,q} A_{i,q}\right) b_q$$

in above formula, $E_q = h_{q,q}^H h_{q,q}$, $A_{i,q} = h_{i,q}^H h_{i,q}$, $h_{q,q}$ is a channel of the coordination cell q to the scheduling user of the coordination cell q, $h_{i,q}$ is the channel of the cell i (i≠q) to scheduling user of the coordination cell q, and $\lambda_{i,q}$ is a weighting coefficient;

in which, the weighting coefficient $\lambda_{i,q}$ is as follows:

$$\lambda_{i,q} = -\frac{I_q + |h_{q,q} b_q|^2 P_q + \sigma_q^2}{I_i + |h_{i,i} b_i|^2 P_i + \sigma_q^2} \times \frac{|h_{i,i} b_i|^2 P_i}{I_i + \sigma_q^2}$$

in above formula, the $I_q$ and $I_i$ are interference signal power received by a user of the coordination cell q and the interference signal power received by a user of the coordination cell i, in which, $$I_q = \sum_{i=1, i \neq q}^{Q} |h_{q,i} b_i|^2 p_i;$$

in which, $h_{q,i}$ is a channel of a scheduling user from the coordination cell i to the coordination cell q.

Furthermore, expression of the $\lambda_{i,q}$ is as follows:

$$\lambda_{i,q} = \frac{1 + \frac{1}{SINR_q}}{1 + \frac{1}{SINR_i}} \frac{S_q}{I_i}$$

in above formula, the $SINR_q$ and $SINR_i$ are respectively the signal to interference noise ratios of the coordination cells q and i, $S_q$ is a signal intensity of a scheduling user in the coordination cell q, in which, $S_q = |h_{q,q} b_q|^2 P_q$. (4) the beam forming vector is solved through the maximum value of a rayleigh quotient, as follows:

$$b_q = \max_{b_q} \frac{b_q^H E_q b_q}{b_q^H \left(-\sum_{i=1, i \neq q}^{Q} \lambda_{i,q} A_{i,q}\right) b_q}, \quad (A)$$

which means the beam forming vector is obtained through maximizing a signal and a weighted interference leakage ratio;

or, the beam forming vector is obtained through the following expression:

$$b_q = V_G^{max}(E_q, -\Sigma_{i=1, i \neq q} \lambda_{i,q} A_{i,q}) \quad (B),$$

in which, $V_G^{max}$ (A, B) is the maximum generalized eigenvalue vector of a matrix A and a matrix B (representing the maximum generalized eigenvalue vector of a matrix $E_q$ and a matrix $-\Sigma_{i=1, i \neq q}^{Q} \lambda_{i,q} A_{i,q}$).

As mentioned above, a coordination cell sum rate is used as a cost function in the method of the embodiment, the beam weight vector component is a constraint condition, and the beam vector solving a problem of inter-cell coordination is transformed into an optimization problem with a constraint. As for the optimization problem, by using the Lagrangian function and a condition satisfied by the optimal solution, a new inter-cell coordination beam forming algorithm is obtained. In the new algorithm, when the signal intensity is maximized, according to the signal to interference noise ratio of the cell, the signal to interference noise ratio of adjacent cells and SOIR (signal to interference noise ratio of the cell and adjacent cell), the interference leakage of the cell to adjacent cells is dynamically adjusted, so as to realize the optimum balance between the system performance and the interference avoidance, improve the effectiveness of the interference management, and further increase the system capacity of the low-power node.

Second, based on the detailed algorithm of the beam forming vector, a process of calculating the beam forming vector of each coordination cell is described, including:

1) beam forming vector calculation of the centralized heterogeneous network:

Step 1, a center node is set. That is, the center node either sets on a base station of a certain coordinate cell or sets independently.

Step 2, measurement data of scheduling users in all coordination cells is collected by the center node, the measurement data includes channel information $h_{i,j}$ of all coordination cells to all scheduling users, i, j=1, . . . , Q etc.;

Step 3, the beam forming vector $b_i$ of each coordination cell is calculated by the center node, i=1, . . . ,Q;

Step 4, the calculated beam forming vector is transmitted to each cell by the center node.

The step of calculating the beam forming vector of each coordination cell by the center node is as follows:

Step 1, initializing, an initial value $b_{i,0}$ of the beam forming vector of each coordinate cell is determined, according to collected measurement data, by the center node, $b_i = b_{i,0}$, i=1, . . . , Q; in which the initial value of the beam forming vector of each coordinate cell can be obtained through random one of currently existed beam forming vector calculation methods, and the calculation method of the initial value is not limited by the disclosure;

Step 2, cycling operation, from the coordination cell i=1 to Q, calculating as follows:

(1) according to collected measurement data, the beam forming vector $b_i$ of the coordination cell i is calculated through the formula (A) or (B);

(2) an old $b_i$ is updated through the calculated beam forming vector $b_i$ of the coordination cell i;

(3) the beam forming vector of a next cell is calculated.

2) the beam forming vector calculation of a distributed heterogeneous network:

in the distributed heterogeneous network, a calculation of the beam forming vector is finished in a base station of each coordination cell, including the following steps:

Step 1, initializing, an initial value $b_{i,0}$ of the beam forming vector of each coordinate cell is calculated by each coordinate cell, $b_i = b_{i,0}$, i=1, . . . , Q, and the calculated initial value is transmitted to other coordination cells;

Step 2, the measurement data of the coordination cell q is received by the coordination cell q, and measurement data fed back by other coordination cells i is received by the coordination cell q, such as $h_{i,i}$, $h_{i,q}$, $b_i$, $I_i$;

Step 3, $E_q$ is calculated by the coordination cell q based on the $h_{q,q}$ and $b_q$ of the coordination cell q, and $\lambda_{i,q} A_{i,q}$ and $I_q$ are calculated through a feedback of other coordination cells i;

Step 4, $b_q$ is calculated and updated by the coordination cell q through the formula (A) or (B), and then $b_q$ is transmitted to other coordination cells, to support the calculating of the beam forming vector of other cells;

Step 5, a cell is selected from other coordination cells, such as q'=q+1, and the beam forming vector of the q' is calculated and updated by itself according to steps 1 to 4;

Step 6, the process is finished after the beam forming vectors of all coordination cells are updated.

Figure 2:
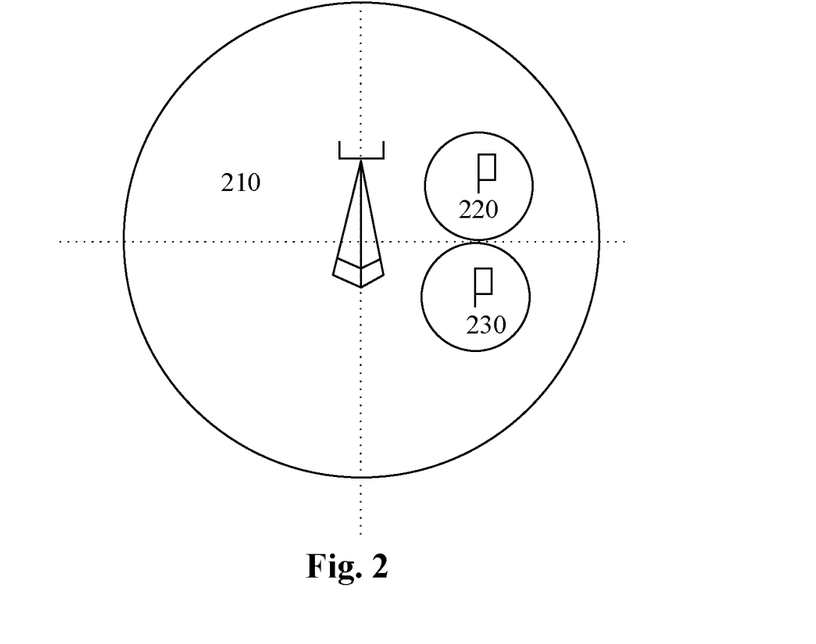
FIG. 2 shows a schematic diagram of a heterogeneous network in an embodiment of the disclosure.

Third, based on the algorithm derivation disclosed in "first" and the basic calculation principle disclosed in "second", an embodiment of the disclosure is described based on the LTE-A system:

as shown in FIG. 2, the heterogeneous network is composed of a macro cell 210 and two femto cells 220, 230, a radius of the macro cell is 500 meters, power is 43 dBm; the two femto cells are covered by the macro cell, the macro cell is set to be a cell 1, and the two femto cells are respectively set to be a cell 2 and a cell 3, and 40 users are supposed to be existed in the three cells.

Figure 3:
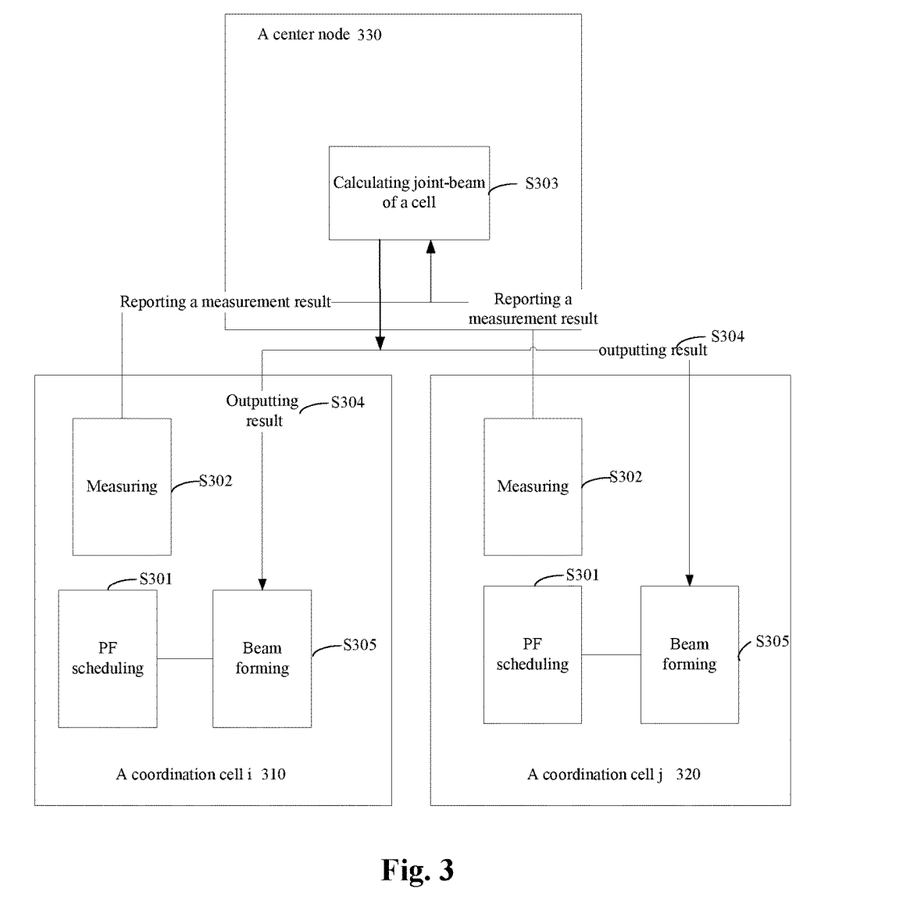
FIG. 3 shows a block diagram of realizing to form a multi-cell beam in a centralized heterogeneous network in an embodiment of the disclosure.

As shown in FIG. 3, the beam forming vector calculation of the centralized heterogeneous network, based on a diagram of the disclosure, mainly including the following two:

(1) coordination cells, such as a coordination cell i 310 and a coordination cell j 320;

(2) a center node 330, which is in random one of the base stations, such as a base station of the macro cell.

A fair scheduler (PF scheduler) and beam selection run independently in the base station of the coordination cell, a user scheduling priority is calculated by the fair scheduler according to a average instantaneous speed and historical instantaneous speed of service user of a cell to which the fair scheduler belongs, the scheduling user is determined according to a priority order, and finally the user is scheduled by a PF scheduler according to an output result of center node and a joint-designed beam vector.

A joint-cell beam selection algorithm is executed by the center node, as follows:

Step S301, the scheduling user is selected by a scheduler of each coordination cell; for example, when three coordination cells C1, C2, C3 exist, then corresponding scheduling users $U_{C1}$, $U_{C2}$, $U_{c3}$ are selected by each coordination cell, the beam forming vector, needed in data transmission from each coordination cell to corresponding scheduling user, is calculated by the center node, and so on, until the beam forming vectors needed by all scheduling users of each coordination cell are calculated.

Step S302, the measurement result, such as channel matrixes of each scheduling user to each cell, is reported to the center node by each coordination cell.

Step S303, the beam forming vector of each coordination cell scheduling user is calculated by the center node through the joint-cell beam selection algorithm.

Step S304, a beam forming vector result is output by the center node, and then transmitted to each coordination cell.

Step S305, user data is transmitted by each coordination cell based on received beam forming vector.

Figure 4:
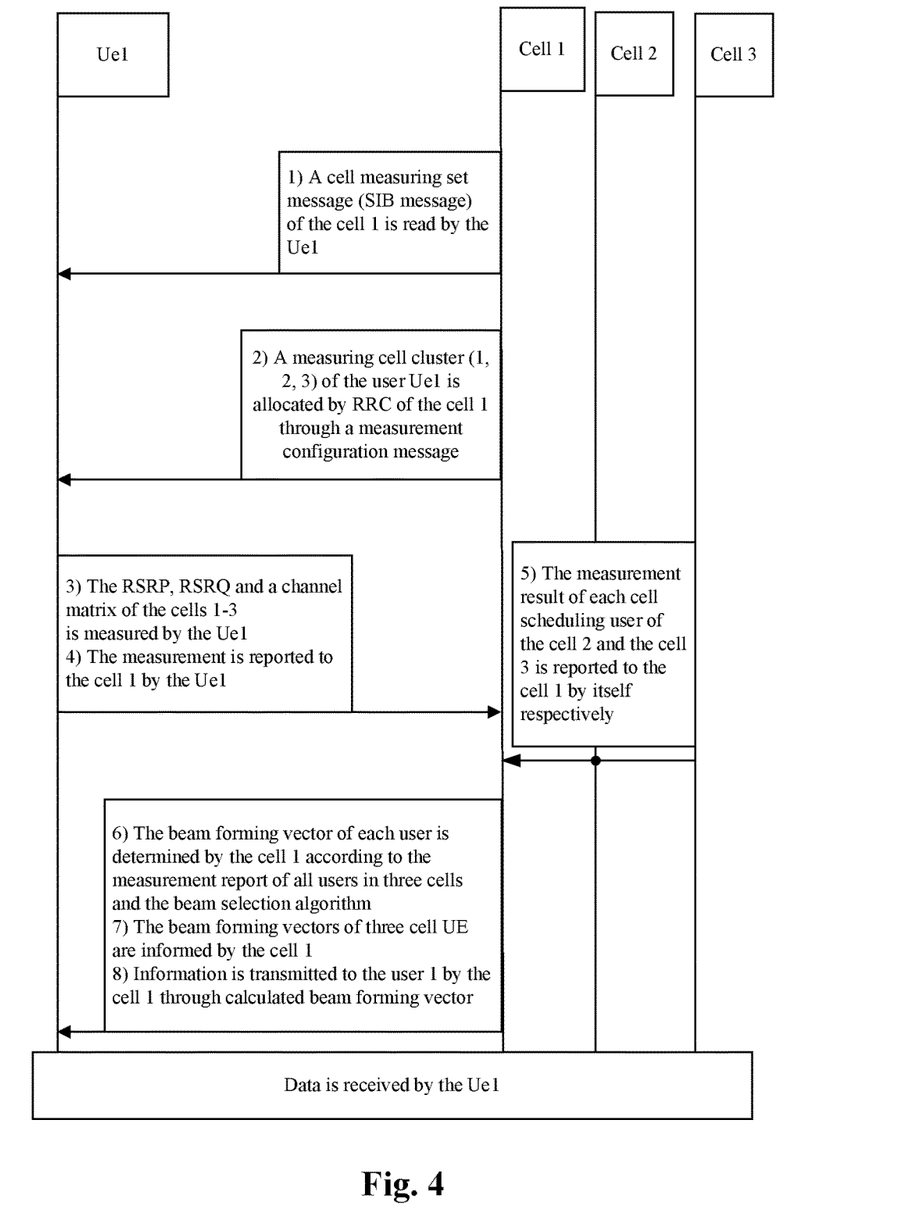
FIG. 4 shows a flowchart of realizing to form a multi-cell beam in a centralized heterogeneous network in an embodiment of the disclosure.

As shown in FIG. 4, it is a flowchart based on the disclosure.

In an LTE, a system message is carried in a system information block (SIB) of a shared broadcast control channel (SBCH). A cell 1 is supposed to be a base station of a center node. Cells 1 to 3, which are coordination cells determined by the center node, are also called a measuring cell cluster; and the cells 1 to 3 extend through a Sib message (which is Sib message in the LTE, newly defined measuring cell cluster), and broadcast in the cell. The measuring cell cluster (Step 1 in the figure), which refers to the cells 1 to 3, can be obtained by an Ue1 through reading the SIB message.

Measurement configuration of the Ue1 to the cells 1 to 3 is realized through measurement configuration IE in a RRC connection reconfiguration message, and the measurement configuration IE is obtained through extending an original message of the LTE system (step 2 in the figure).

Parameter measuring (step 3, 4 in the figure.), such as a measuring of a reference signal receiving power (RSRP), a reference signal received quality (RSRQ) and a channel matrix etc., needed in a cell cluster (cells 1, 2 and 3) algorithm is finished by the user Ue1 (namely scheduling user) according to the measurement configuration and the measuring is executed based on public pilot symbols of the cells 1 to 3.

The measurement result of cell scheduling users of the cell 2 and the cell 3 is respectively reported to the cell 1 by the cell 2 and the cell 3 (step 5 in the figure).

The measurement value of all scheduling users to the cell cluster (cells 1, 2 and 3) is collected by the cell 1.

A beam selection vector of a scheduling user is calculated by the cell 1, and informed to each cell, the user is scheduled by the PF scheduler of each cell according to received beam forming vector in order (step 6, 7 in the figure).

Data is transmitted between each cell (cells 1, 2, 3) and the scheduling user of each cell (step 8 in the figure).

Figure 5:
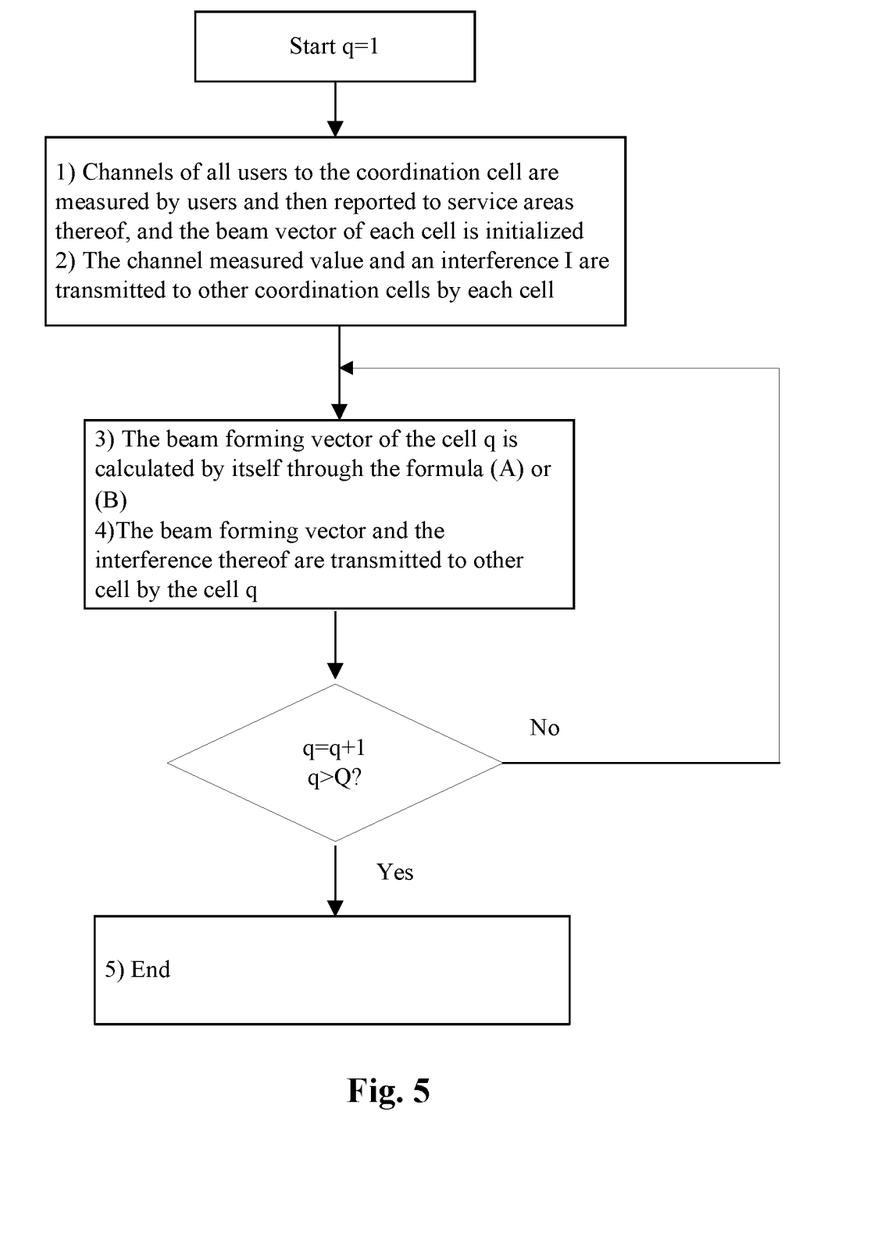
FIG. 5 shows a flowchart of realizing to form a multi-cell beam in a distributed heterogeneous network in an embodiment of the disclosure.

FIG. 5 shows a flowchart of a distributed coordination cell beam selection algorithm based on the disclosure, the algorithm mainly includes three parts: a beam forming vector initialization, a first coordination cell beam forming vector calculating and updating, and other coordination cell beam forming vectors calculating and updating, in which the beam forming vector initialization is calculated before a starting of the distributed algorithm, including the steps 1 and 2 in FIG. 5.

The beam forming vector initialization provides an initial value for subsequent beam selection algorithm, the calculation process includes:

a) channel measurement values of all users are collected by each cell firstly;

b) the beam forming vector of each cell is obtained, according to the channel measurement value, by each cell through a characteristic value method, which is set to be the initial value of the beam forming vector of each cell; it needs to be noted that the method for characteristic value is only a method used for obtaining the beam forming vector, it is an example, not for limiting;

c) the initial value of each cell is transmitted to other cells, for example, the initial value of the beam forming vector of the cell 1 is transmitted to the cells 2 and 3, the initial value of vector of the cell 2 is transmitted to the cells 1 and 3, and the initial value of vector of the cell 3 is transmitted to the cells 1 and 2.

In beam forming vector calculating and updating process, only the beam forming vector of one cell is calculated and updated each time; in order to describe the updating process, the cell 1 here is set to be an example, the cell 1 is updated firstly, which means the updated cell is q=1, the updating process is as follows:

(1) measurement data information of other cells is received, including: the beam forming vector of other cells, a channel estimated value of the scheduling user of other cells, and the scheduling user interference values of other cells are received by the cell 1;

(2) a new beam forming vector of the cell 1 is calculated, according to the measurement data of the cell and the measurement data of other cells, by the cell 1 through the beam forming vector calculation formula (A) or (B);

(3) the updated beam forming vector is transmitted to other cells by the cell 1.

The last process is updating a cell circulation, then, the cell which calculates the beam forming vector is a cell q=q+1=2, that is, the updated cell is q=q+1, and the beam forming vector updating operation of the new updated cell is finished through the beam forming vector calculating and updating process.

When q=Q, Q is a sum of the coordination cells, which means the beam forming vector updating operations of all coordination cells are finished; through the above three processes, the cell coordination selection updating processes of all users are finished.

Example Embodiment 2

Figure 6:
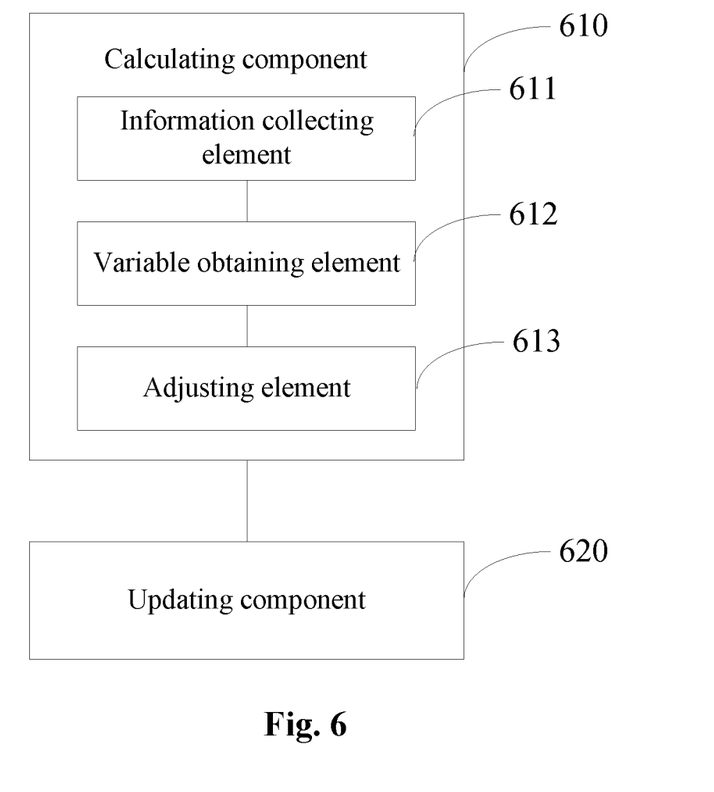
FIG. 6 shows a structural block diagram of a device for forming a multi-cell beam in an embodiment of the disclosure.

The embodiment of the disclosure discloses a device for forming a multi-cell beam, as shown in FIG. 6, including:

a calculating component 610, which is arranged to, calculate, according to a principle of maximizing a signal intensity of the coordination cell scheduling user and minimizing a weighted interference leakage of the coordination cell scheduling user to other coordination cell scheduling users, calculate a beam forming vector $b_q$ of each coordination cell in a heterogeneous network; and an updating component 620, which is arranged to update the beam forming vector $b_q$ of a corresponding coordination cell according to a calculation result of the calculating component, to enable each coordination cell to transmit data to a corresponding scheduling user according to updated beam forming vector $b_q$.

In an example embodiment, the calculating component 610 includes:

an information collecting element 611, which is arranged to collect measurement data obtained, according to preset measuring configuration information, by each coordination cell scheduling user in the heterogeneous network;

a variable obtaining component 612, which is arranged to obtain, according to collected measurement data, a signal intensity information including an unknown quantity $b_q$ of the coordination cell scheduling user, and a weighted interference leakage information of the coordination cell scheduling user to other coordination cell scheduling users; and an adjusting element 613, which is arranged to, adjust a value of $b_q$ of the coordination cell so as to adjust the signal intensity of the coordination cell scheduling user and a value of the weighted interference leakage of the coordination cell scheduling user to other coordination cell scheduling users, in which the value of $b_q$ of the coordination cell is determined according to the principle of maximizing the signal intensity of the coordination cell scheduling user and minimizing the weighted interference leakage of the coordination cell scheduling user to other coordination cell scheduling users, determine the value of $b_q$ of the coordination cell.

In an example embodiment, the measurement data collected by the information collecting element 611 includes: channels of all coordination cells to all scheduling users, a beam forming vector of each coordination cell, and power information of an interference signal received by each coordination cell scheduling user.

In an example embodiment, as for the coordination cell, the collected beam forming vector is a variable to be solved; as for other coordination cells, when the beam forming vector of the corresponding coordination cell is updated, then the collected beam forming vector is a vector value updated lately; otherwise, the collected beam forming vector is an initial value of the beam forming vector obtained, according to an inherent algorithm, by the corresponding coordination cell according to an inherent algorithm.

Optionally, the beam forming vector obtained by the calculating component through above calculation principle is:

$$b_q = \max_{b_q} \frac{b_q^H E_q b_q}{b_q^H \left( -\sum_{i=1, i \neq q}^{Q} \lambda_{i,q} A_{i,q} \right) b_q}; \text{ or}$$

$$b_q = V_G^{max}\left(E_q, -\sum_{i=1, i \neq q}^{Q} \lambda_{i,q} A_{i,q}\right);$$

in above-mentioned formula, $b_q^H$ is a conjugate transpose of the $b_q$, $E_q = h_{q,q}^H h_{q,q}$, $h_{q,q}$ is a channel of the coordination cell q to a scheduling user of the coordination cell q, $A_{i,q} = h_{i,q}^H h_{i,q}$, $h_{i,q}$ is a channel of other coordination cells i (i≠q) to scheduling user of the coordination cell q, $\lambda_{i,q}$ is a weighting coefficient, $V_G^{max}(A, B)$ is the maximum generalized eigenvalue vector of a matrix A and a matrix B (representing the maximum generalized eigenvalue vector of matrix $E_q$ and matrix $-\sum_{i=1, i \neq q}^{Q} \lambda_{i,q} A_{i,q}$) and Q is a quantity of the coordination cells.

The data transmission, based on the beam forming vector calculated through the device of the disclosure, realizes an optimum balance between system performance and interference avoidance, improves an effectiveness of interference management, and further increases a system capacity of the low-power node.

Example Embodiment 3

The disclosure further discloses a coordination base station, which covers at least one coordination cell in a heterogeneous network, and the coordination base station includes the device for forming a multi-cell beam in example embodiment 2 of the disclosure.

Further, when a heterogeneous network system is a centralized system, a coordination base station, which is not selected to be a center node, closes a function of the device for forming the multi-cell beam; or the coordination base station, which is selected to be the center node, enables the device for forming the multi-cell beam and calculates the beam forming vector of each coordination cell in the heterogeneous network one by one; and when the heterogeneous network system is a distributed system, each coordination base stations enables the device for forming the multi-cell beam, calculates the beam forming vectors $b_q$ corresponding to each coordination cell one by one and transmits calculated beam forming vector to other coordination base stations.

Further, the composition of the device for forming the multi-cell beam and the process of calculating the beam forming vector are described in the example embodiment 2, then the detailed process of the coordination base station is not repeated here.

In addition, all implementation schemes of the example embodiment 2 are included in the embodiment, then all the technical effects of the example embodiment 2 can be realized by the embodiment.

Obviously, any modifications and transformations within the spirit and principle of the disclosure can be made by those skilled in the field. Thus, if the modifications and transformations belong to the claims and equivalent technical range of the disclosure, then the modifications and transformations shall fall within the scope of protection of the disclosure.

INDUSTRIAL APPLICABILITY

The method and device in embodiments of the disclosure, when calculating the beam forming vector of corresponding coordination cell and maximizing the signal intensity of the corresponding coordination cell, the interference leakage to adjacent cells is dynamically adjusted according to an SINR of the cell, an SINR of the adjacent cells and an SOIR (signal to other cell interference ratio), dynamically adjust the interference leakage to adjacent cells, thereby realizing an optimum balance between system performance and interference avoidance, improving an effectiveness of interference management, and further increasing a system capacity of the low-power node.

What is claimed is:

1. A method for forming a multi-cell beam, comprising:
  calculating, according to a principle of maximizing a signal intensity of a coordination cell scheduling user and minimizing a weighted interference leakage ratio of the coordination cell scheduling user to other coordination cell scheduling users, a beam forming vector $b_q$ of each coordination cell in a heterogeneous network; and
  updating the beam forming vector $b_q$ of a corresponding coordination cell according to a calculation result, to enable each coordination cell to transmit data to a corresponding scheduling user according to the updated beam forming vector $b_q$;

wherein as for each coordination cell, calculating the beam forming vector $b_q$, comprising: collecting measurement data obtained, according to preset measuring configuration information, by each coordination cell scheduling user; obtaining, according to collected measurement data, signal intensity information comprising an unknown quantity $b_q$ of the coordination cell scheduling user, and weighted interference leakage ratio information of the coordination cell scheduling user to other coordination cell scheduling users; and adjusting a value of $b_q$ of the coordination cell so as to adjust the signal intensity of the coordination cell scheduling user and a value of the weighted interference leakage ratio of the coordination cell scheduling user to other coordination cell scheduling users, wherein the value of $b_q$ of the coordination cell is determined according to the principle of maximizing the signal intensity of the coordination cell scheduling user and minimizing the weighted interference leakage ratio of the coordination cell scheduling user to other coordination cell scheduling users.

2. The method as claimed in claim 1, wherein the collected measurement data comprises: channels of all coordination cells to all scheduling users, a beam forming vector of each coordination cell, and power information of an interference signal received by each coordination cell scheduling user.

3. The method as claimed in claim 2, wherein the collected beam forming vector of each coordination cell comprises:
as for the coordination cell, the collected beam forming vector is a variable to be solved; and
as for other coordination cells, when the beam forming vector of the corresponding coordination cell is updated, the collected beam forming vector is a vector value updated lately; otherwise, the collected beam forming vector is an initial value of the beam forming vector obtained, according to an inherent algorithm, by the corresponding coordination cell.

4. The method as claimed in claim 3, wherein when a beam forming vector of a centralized heterogeneous network is calculated, the measurement data needed for calculating the beam forming vectors of corresponding coordination cells is pre-collected by the center node.

5. The method as claimed in claim 1, wherein the beam forming vector is calculated by one of the following formulas:

$$b_q = \max_{b_q} \frac{b_q^H E_q b_q}{b_q^H \left(-\sum_{i=1,i\neq q}^Q \lambda_{i,q} A_{i,q}\right) b_q};$$

$$b_q = V_G^{max}\left(E_q, -\sum_{i=1,i\neq q}^Q \lambda_{i,q} A_{i,q}\right);$$

in above-mentioned formulas, $b_q^H$ is a conjugate transpose of the $b_q$, $E_q = h_{q,q}^H h_{q,q}$, $h_{q,q}$ is a channel of the coordination cell q to a scheduling user of the coordination cell q, $A_{i,q} = h_{i,q}^H h_{i,q}$, $h_{i,q}$ is a channel of other coordination cells i (i≠q) to the scheduling user of the coordination cell q, $\lambda_{i,q}$ is a weighting coefficient, $V_G^{max}(A,B)$ is the maximum generalized eigenvalue vector of a matrix A and a matrix B, and Q is a quantity of the coordination cells.

6. The method as claimed in claim 5, wherein the weighting coefficient $\lambda_{i,q}$ is calculated by the following formulas:

$$\lambda_{i,q} = -\frac{I_q + |h_{q,q} b_q|^2 p_q + \sigma_q^2}{I_i + |h_{i,i} b_i|^2 p_i + \sigma_q^2} \times \frac{|h_{i,i} b_i|^2 p_i}{I_i + \sigma_q^2}$$

wherein $I_q$ and $I_i$ are interference signal power received by the scheduling user of the coordination cell q and the interference signal power received by the scheduling user of the coordination cell i, $h_{q,i}$ is a channel of a scheduling user from the coordination cell q to the coordination cell i.

7. The method as claimed in claim 1, wherein the method further comprises:
when the coordination cell is a centralized coordination cell, calculating, by a preset center node, the beam forming vector $b_q$ of each coordination cell scheduling user in the heterogeneous network one by one, and transmitting, by the preset center node, each beam forming vector $b_q$ to a corresponding coordination cell; and
when the coordination cells are distributed coordination cells, calculating, by each coordination cell, the beam forming vector $b_q$ of the cell scheduling user one by one, and transmitting, by each coordination cell, the calculated beam forming vector $b_q$ to other coordination cells.

8. The method as claimed in claim 5, wherein the weighting coefficient $\lambda_{i,q}$ is also calculated by the following formulas:

$$\lambda_{i,q} = \frac{1 + \frac{1}{SINR_q}}{1 + \frac{1}{SINR_i}} \frac{S_q}{I_i}$$

wherein $SINR_q$ and $SINR_i$ are respectively the signal to interference noise ratios of the coordination cells q and i, $S_q$ is a signal intensity of the scheduling user in the coordination cell q.

9. A device for forming a multi-cell beam, comprising: a hardware processor coupled with a memory and configured to execute program components stored on the memory, wherein the program components comprise:
a calculating component, arranged to, calculate, according to a principle of maximizing a signal intensity of the coordination cell scheduling user and minimizing a weighted interference leakage ratio of the coordination cell scheduling user to other coordination cell scheduling users, a beam forming vector $b_q$ of each coordination cell in a heterogeneous network; and
an updating component, arranged to update the beam forming vector $b_q$ of a corresponding coordination cell according to a calculation result of the calculating component, to enable each coordination cell to transmit data to a corresponding scheduling user according to the updated beam forming vector $b_q$;
wherein the calculating component comprises: an information collecting element, arranged to collect measurement data obtained, according to preset measuring configuration information, by each coordination cell scheduling user in the heterogeneous network; a variable obtaining component, arranged to obtain, according to collected measurement data, signal intensity information comprising an unknown quantity $b_q$ of the coordination cell scheduling user, and weighted interference leakage ratio information of the coordination cell scheduling user to other coordination cell scheduling users; and an adjusting element, arranged to, adjust a value of $b_q$ of the coordination cell so as to adjust the signal intensity of the coordination cell scheduling user and a value of the weighted interference leakage ratio of the coordination cell scheduling user to other coordination cell scheduling users, wherein the value of $b_q$ of the coordination cell is determined according to the principle of maximizing the signal intensity of the coordination cell scheduling user and minimizing the weighted interference leakage ratio of the coordination cell scheduling user to other coordination cell scheduling users, determine the value of $b_q$ of the coordination cell.

10. The device as claimed in claim 9, wherein the measurement data collected by the information collecting element comprises: channels of all coordination cells to all scheduling users, a beam forming vector of each coordination cell, and power information of an interference signal received by each coordination cell scheduling user;
wherein as for the coordination cell, the collected beam forming vector is a variable to be solved; and
as for other coordination cells, when the beam forming vector of the corresponding coordination cell is updated, then the collected beam forming vector is a vector value updated lately; otherwise, the collected beam forming vector is an initial value of the beam forming vector obtained, according to an inherent algorithm, by the corresponding coordination cell.

11. The device as claimed in claim 10, wherein when a beam forming vector of a centralized heterogeneous network is calculated, the measurement data needed for calculating the beam forming vectors of corresponding coordination cells is pre-collected by the center node.

12. A coordination base station, covering at least one coordination cell in a heterogeneous network, the coordination base station comprises the device for forming the multi-cell beam according to claim 10.

13. The device as claimed in claim 9, wherein the beam forming vector obtained by the calculating component is:

$$b_q = \max_{b_q} \frac{b_q^H E_q b_q}{b_q^H \left(-\sum_{i=1,i\neq q}^{Q} \lambda_{i,q} A_{i,q}\right) b_q}; \text{ or}$$

$$b_q = V_G^{max}\left(E_q, -\sum_{i=1,i\neq q}^{Q} \lambda_{i,q} A_{i,q}\right);$$

in above-mentioned formula, $b_q^H$ is a conjugate transpose of the $b_q$, $E_q = h_{q,q}^H h_{q,q}$, $h_{q,q}$ is a channel of the coordination cell q to a scheduling user of the coordination cell q, $A_{i,q} = h_{i,q}^H h_{i,q}$, $h_{i,q}$ is a channel of other coordination cells i ($i \neq q$) to the scheduling user of the coordination cell q, $\lambda_{i,q}$ is a weighting coefficient, $V_G^{max}$ (A,B) is the maximum generalized eigenvalue vector of a matrix A and a matrix B, and Q is a quantity of the coordination cells.

14. The device as claimed in claim 13, wherein the weighting coefficient $\lambda_{i,q}$ is calculated by the following formulas:

$$\lambda_{i,q} = -\frac{I_q + |h_{q,q}b_q|^2 p_q + \sigma_q^2}{I_i + |h_{i,i}b_i|^2 p_i + \sigma_q^2} \times \frac{|h_{i,i}b_i|^2 p_i}{I_i + \sigma_q^2}$$

wherein $I_q$ and $I_i$ are interference signal power received by the scheduling user of the coordination cell q and the interference signal power received by the scheduling user of the coordination cell i, $h_{q,i}$ is a channel of a scheduling user from the coordination cell q to the coordination cell i.

15. The device as claimed in claim 13, wherein the weighting coefficient $\lambda_{i,q}$ is also calculated by the following formulas:

$$\lambda_{i,q} = \frac{1 + \frac{1}{SINR_q}}{1 + \frac{1}{SINR_i}} \frac{S_q}{I_i}$$

wherein $SINR_q$ and $SINR_i$ are respectively the signal to interference noise ratios of the coordination cells q and i, $S_q$ is a signal intensity of the scheduling user in the coordination cell q.

16. A coordination base station, covering at least one coordination cell in a heterogeneous network, the coordination base station comprises the device for forming the multi-cell beam according to claim 9.

17. The coordination base station as claimed in claim 16, wherein
when a heterogeneous network system is a centralized system, a coordination base station, which is not selected to be a center node, closes a function of the device for forming the multi-cell beam; or the coordination base station, which is selected to be the center node, enables the device for forming the multi-cell beam and calculates the beam forming vector of each coordination cell in the heterogeneous network one by one; and
when the heterogeneous network system is a distributed system, each coordination base station enables the device for forming the multi-cell beam, calculates the beam forming vector $b_q$ corresponding to each coordination cell one by one and transmits calculated beam forming vector to other coordination base stations.

18. A coordination base station, covering at least one coordination cell in a heterogeneous network, the coordination base station comprises the device for forming the multi-cell beam according to claim 9.

* * * * *